(12) United States Patent
Stuerz et al.

(10) Patent No.: US 6,202,624 B1
(45) Date of Patent: Mar. 20, 2001

(54) SYSTEM FOR OPERATING AN INTERNAL COMBUSTION ENGINE WITH DIRECT INJECTION, SPECIALLY IN A MOTOR VEHICLE

(75) Inventors: Manfred Stuerz, Leonberg; Uwe Maienberg, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/254,135

(22) PCT Filed: Jun. 25, 1998

(86) PCT No.: PCT/DE98/01742

§ 371 Date: Mar. 1, 1999

§ 102(e) Date: Mar. 1, 1999

(87) PCT Pub. No.: WO99/00591

PCT Pub. Date: Jan. 7, 1999

(30) Foreign Application Priority Data

Jun. 27, 1997 (DE) .............................................. 197 27 385

(51) Int. Cl.$^7$ ............................. F02D 21/08; F02B 17/00; F02M 25/07
(52) U.S. Cl. ....................................... 123/295; 123/568.21
(58) Field of Search ................................... 123/295, 305, 123/568.14, 568.21

(56) References Cited

U.S. PATENT DOCUMENTS

| | | | |
|---|---|---|---|
| 3,802,402 | * 4/1974 | Swatman | 123/568.29 X |
| 5,005,552 | * 4/1991 | Kawamura | 123/568.14 |
| 5,224,460 | * 7/1993 | Havstad et al. | 123/568.14 |
| 5,524,591 | * 6/1996 | Hirota et al. | 123/568.21 |
| 5,960,765 | * 10/1999 | Iida et al. | 123/305 X |

FOREIGN PATENT DOCUMENTS

| | | |
|---|---|---|
| 4317660 | 6/1994 | (DE) . |
| 0848146 | 6/1998 | (EP) . |
| 2165587 | 4/1986 | (GB) . |
| 60-036719 | 7/1985 | (JP) . |
| 7-269416 | 2/1996 | (JP) . |
| 9-158767 | 10/1997 | (JP) . |

OTHER PUBLICATIONS

"Die Wirbelkammer" by Hermann Reil in "mot", No. 2, Jan. 1997.

* cited by examiner

Primary Examiner—Tony M. Argenbright
(74) Attorney, Agent, or Firm—Walter Ottesen

(57) ABSTRACT

An internal combustion engine for a motor vehicle is described which is provided with an injection valve with which fuel can be injected directly into the combustion chamber either in a first mode of operation during a compression phase or in a second mode of operation during an induction phase. Furthermore, the engine is provided with means for feeding back the exhaust gas into the combustion chamber as well as with a control apparatus for controlling (open loop and/or closed loop) the quantity of the fed back exhaust gas. According to the invention, the quantity of the exhaust gas, which is fed back into the combustion chamber, can be controlled (open loop and/or closed loop) differently in the two modes of operation.

15 Claims, 3 Drawing Sheets

SYSTEM FOR OPERATING AN INTERNAL COMBUSTION ENGINE WITH DIRECT INJECTION, SPECIALLY IN A MOTOR VEHICLE

FIELD OF THE INVENTION

The invention relates to a method for operating an internal combustion engine of a motor vehicle wherein the fuel is injected directly into the combustion chamber of the engine either in a first operating mode during a compression phase or in a second operating mode during an intake phase and the fuel is combusted in the combustion chamber. In the method, at least a portion of the exhaust gas, which is generated in the combustion, is fed back into the combustion chamber. Furthermore, the invention relates to an internal combustion engine especially for a motor vehicle. The engine has an injection valve with which fuel can be injected directly into a combustion chamber either in a first mode of operation during a combustion phase or in a second mode of operation during an intake phase. The engine also includes means for feeding back the exhaust gas into the combustion chamber and has a control apparatus for controlling (open loop/closed loop) the quantity of exhaust gas fed back.

BACKGROUND OF THE INVENTION

A system of this kind for operating an internal combustion engine having direct injection especially for a motor vehicle is generally known and is continuously further developed with respect to a further reduction of fuel and a reduction of exhaust gas.

In this connection, a so-called stratified charge operation as a first operating mode and a so-called homogeneous operation as a second operating mode are distinguished. The stratified charge operation is especially used for small loads; whereas, the homogeneous operation is applied for larger loads applied to the engine. In the stratified charge operation, the fuel is injected into the combustion chamber during the combustion phase and is there injected in the immediate vicinity of a spark plug. The fuel can however also be injected further distant from the spark plug and can be conducted to the spark plug via a movement of air. This has the consequence that no uniform distribution of the fuel can take place in the combustion chamber. The advantage of the stratified operation is that the applied smaller loads can be handled by the engine with a very small quantity of fuel. Larger loads, however, cannot be satisfied in the stratified charge operation. In the homogeneous operation, which is provided for such larger loads, the fuel is injected during the intake phase of the engine so that a swirling and therefore a distribution of the fuel in the combustion chamber can still easily take place. To this extent, the homogeneous operation corresponds approximately to the operation of internal combustion engines wherein fuel is injected into the intake manifold in the conventional manner.

In both modes of operation, that is, in the stratified load operation and in the homogeneous operation, the fuel quantity to be injected is controlled (open loop and/or closed loop) to an optimal value in dependence upon a plurality of input quantities with respect to a reduction of fuel, a reduction of exhaust gas and the like.

Here it is advantageous for the reduction of the generated exhaust gas when the exhaust, which arises in the combustion in the combustion chambers, is not immediately discharged into the ambient and is instead fed back into the combustion chambers in order to again be conducted for combustion.

SUMMARY OF THE INVENTION

It is an object of the invention to provide an internal combustion engine having direct injection wherein further fuel reductions and exhaust gas reductions are possible with the aid of the exhaust-gas feedback.

This task is solved in a method of the above-mentioned type or for an internal combustion engine of the above-mentioned type in that the quantity of exhaust gas, which is fed back into the combustion chamber, is differently controlled in both modes of operation with the control being open loop and/or closed loop.

Accordingly, both modes of operation of the internal combustion engine having direct injection are considered in the control (open loop/closed loop) of the exhaust gas which is fed back. This means that especially in stratified charge operation, the exhaust-gas feedback is controlled (open loop and/or closed loop) differently than in homogeneous operation and the greatest reduction in fuel is achievable in stratified charge operation. Thus, in stratified charge operation, it is necessary to reduce the nitrogen oxide emissions which occur in this mode of operation via a corresponding exhaust-gas feedback as far as possible. Furthermore, and according to the invention, the transitions which are present between the two modes of operation, are controlled differently (open loop and/or closed loop). In total, a system for operating an internal combustion engine having direct injection is thereby achieved with which an optimal fuel reduction with simultaneous exhaust gas reduction is obtained based on the particular adapted control (open loop and/or closed loop) in each mode of operation.

In an advantageous configuration of the invention, the quantity of feedback exhaust gas in the first mode of operation is controlled (open loop and/or closed loop) in dependence upon the rpm of the engine and/or upon the torque, which is to be outputted by the engine, and/or the fuel mass which is to be injected into the combustion chamber. Accordingly, in the stratified charge operation, a complex and complete control (open loop and/or closed loop) of the exhaust-gas feedback is carried out. In this way, it is achieved that nitrogen oxide emissions, which arise in the stratified charge operation, are reduced to a minimum with the aid of the exhaust-gas feedback. According to the invention, the reductions in fuel, which are possible in stratified charge operation, are achievable with a simultaneous reduction in exhaust gas.

It is especially purposeful when the following are considered: the intake air temperature and/or the engine temperature and/or the ambient pressure and/or the degree of tank venting and/or the like. In the control (open loop and/or closed loop) according to the invention of the exhaust-gas feedback in layered charge operation, not only are the dynamic operating conditions considered such as the rpm of the engine but also the statistical operating conditions such as the engine temperature. In this way, the control (open loop and/or closed loop) is optimally adapted to the conditions of the internal combustion engine and an optimal reduction of the generated exhaust gas is thereby achieved.

In an advantageous further improvement of the invention, the quantity of the exhaust gas, which is fed back into the combustion chamber, is controlled (open loop and/or closed loop) in dependence upon the intake-manifold pressure for a switchover into the first mode of operation. In this way, it is achieved that a transition as uniform as possible is present with the switchover from the homogeneous operation into the stratified charge operation. In this connection, it is especially purposeful when the exhaust-gas feedback is adapted to the dynamic of the intake manifold.

In an advantageous embodiment of the invention, a constant quantity and especially a small quantity or even no exhaust gas is fed back in the second mode of operation. In the homogeneous operation, only a small or even no exhaust-gas feedback is therefore required. In this way, it is avoided in homogeneous operation that a feedback of exhaust gas which is too high leads to disturbances of the combustions in the combustion chambers.

In an advantageous improvement of the invention, for a switchover into the second mode of operation, an actual switchover is only made after a pregiven time duration. Because of the dynamic of the exhaust-gas feedback, a larger quantity of exhaust is fed back after a switchover which is to be made. If, under these preconditions, a switchover were made into the stratified charge operation, this could lead to combustion misfires or the like. Therefore, the actual switchover into the stratified charge operation is delayed. In this way, combustion misfires are reliably avoided. During this delay, the exhaust-gas feedback is already adjusted to the value required for the stratified charge operation, that is, to a small quantity or even no feedback exhaust gas.

In an advantageous embodiment of the invention, the quantity of the actual fed back exhaust gas is determined and is compared to the desired quantity of the fed back exhaust gas and a correction is carried out in dependence thereon. Thus, a desired/actual comparison is carried out on the basis of which the exhaust-gas feedback is then influenced. In this way, a rapid and precise adaptation of the exhaust-gas feedback to the changes, for example of the operating conditions of the engine, is achieved.

In a further advantageous embodiment of the invention, the exhaust gas is fed back via an internal exhaust-gas feedback and/or via an external exhaust-gas feedback into the combustion chamber of the engine. For the external exhaust-gas feedback, it can be concerned with an exhaust-gas pipe which connects the exhaust-gas end of the engine to the intake end thereof. It is especially purposeful when an exhaust-gas feedback valve is provided in this exhaust-gas pipe which is adjustable for controlling (open loop and/or closed loop) the quantity of the exhaust gas fed back. In this way, it is especially possible in a simple manner to control (open loop and/or closed loop) the exhaust which is fed back via the external exhaust-gas return path. An internal exhaust-gas return path can, for example, relate to a displacing mechanism for the camshaft with which it can be achieved that the inlet and outlet valves, which are controlled by the camshaft, are at least opened simultaneously for a short time. An exhaust-gas feedback via the outlet and inlet valves can take place during this short time duration.

In an advantageous further improvement of the invention, the quantity of the actual fed back exhaust gas is determined in dependence upon: the intake manifold pressure and/or the inducted air mass and/or the exhaust-gas temperature. It is especially purposeful when the position of the exhaust-gas return valve and/or the position of the camshaft is detected by the control apparatus. In this way, it is possible to rapidly and precisely determine the quantity of the actual fed back exhaust gas and to consider the quantity of the fed back exhaust gas in the control (open loop and/or closed loop).

In a further advantageous improvement of the invention, the quantity of the exhaust gas, which is returned into the combustion chamber of the engine, is considered in the control (open loop and/or closed loop) of the fuel mass which is to be injected into the combustion chamber and/or of the ignition spark igniting the fuel in the combustion chamber. In this way, it is achieved that the effect of the fed back exhaust gas on the combustion leads to no change of the combustion process.

The realization of the method of the invention in the form of an electric storage medium is of special significance. This storage medium is provided for a control apparatus of an internal combustion engine and especially of a motor vehicle. A program is stored on the electric storage medium which can be run on a computer apparatus (especially on a microprocessor) and is suitable for carrying out the method of the invention. In this case, the invention is realized by a program stored on the electric storage medium so that this storage medium, which is provided with the program, defines the invention in the same manner as the method for which the execution of the program is suitable.

DESCRIPTION OF THE PREFERRED
EMBODIMENTS OF THE INVENTION

Figure 1:
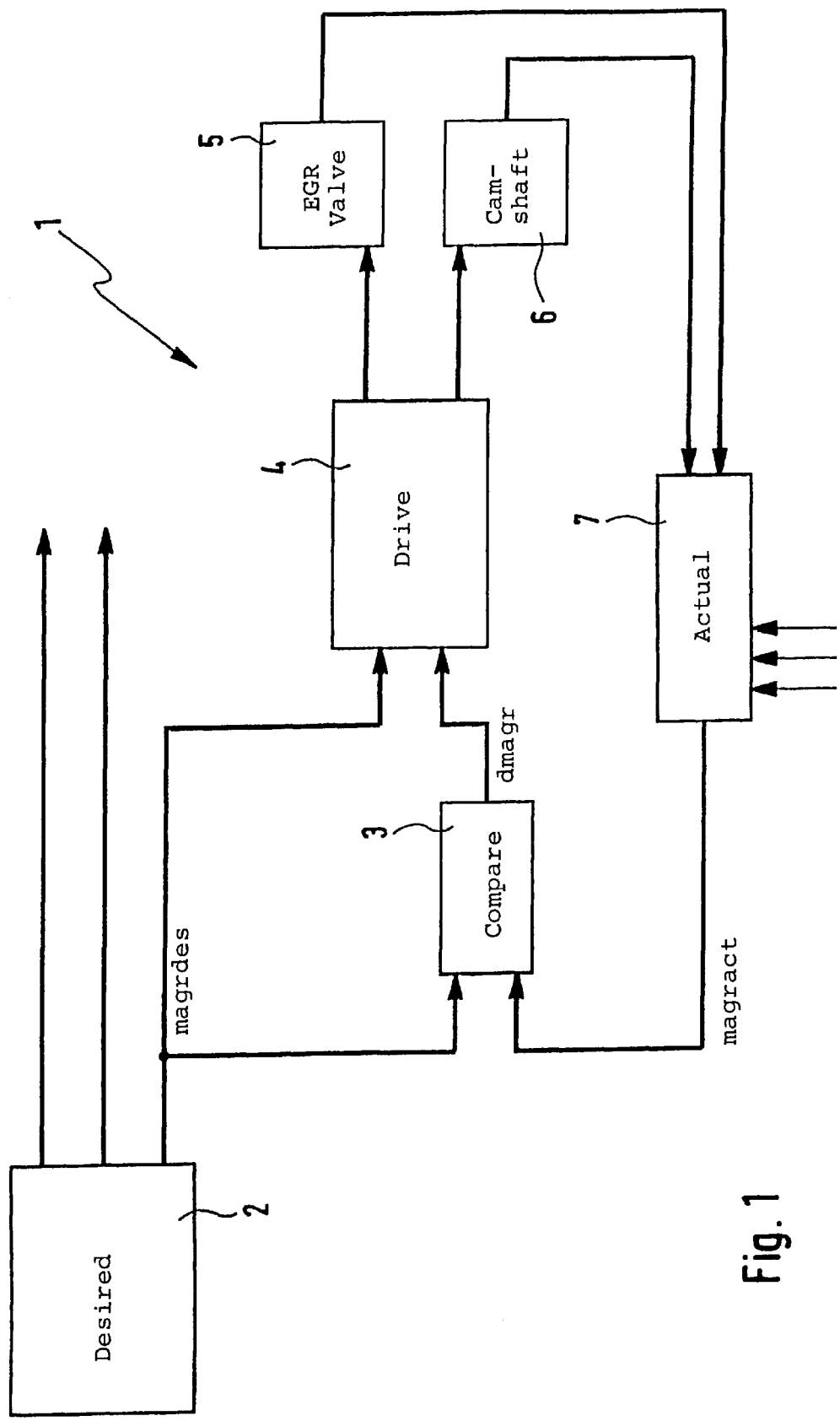
FIG. 1 shows a schematic block circuit diagram of an embodiment of a control of the exhaust-gas feedback according to the invention.

In FIG. 1, a control 1 is shown for the exhaust-gas feedback for an internal combustion engine having direct injection. In this control, a desired value generation 2 is provided which makes available a desired value magrdes for the quantity of the exhaust gas to be fed back. This desired value generation 2 is explained in greater detail with respect to FIG. 2.

Corresponding to FIG. 1, the desired value magrdes is supplied to a comparator 3 and a drive unit 4. In the comparator 3, the desired value magrdes is compared to an actual value magract of the quantity of the exhaust gas to be fed back and a corrective value dmagr is generated in dependence upon the difference and is likewise supplied to the drive unit 4.

The exhaust-gas feedback is influenced with the aid of the drive unit 4. Thus, it is possible that the drive unit 4 influences an external exhaust-gas feedback in that an exhaust-gas feedback valve 5 is adjusted by the control unit 4. In this way, so much more exhaust gas is fed back into the combustion chambers of the engine the more the exhaust-gas return valve is opened. Furthermore, it is possible that the drive unit 4 influences an internal exhaust-gas feedback in that the camshaft 6 of the engine is shifted by the drive unit. Then, the exhaust gas is fed back into the combustion chambers for that time duration during which the inlet and outlet valves are simultaneously opened by the camshaft.

The exhaust-gas feedback valve 5 and the camshaft 6 are influenced by the drive unit 4 in dependence upon the desired value magrdes and the corrective value dmagr. The desired value magrdes is therefore continuously corrected by the corrective value dmagr. The division of the total exhaust-gas feedback to the external and the internal exhaust-gas feedback can take place with respect to characteristic fields or other relationships.

The position of the exhaust-gas feedback valve 5 and the position of the camshaft 6 can be detected with the aid of sensors. These signals are supplied to an actual value generator 7 which determines the actual value magract for the actual quantity of the fed back exhaust gas based on this signal as well as additional data such as the intake manifold pressure and/or the inducted air mass and/or the exhaust-gas temperature. The actual value magract is then supplied to the comparator 3 as already mentioned.

With the aid of the control 1, which is shown in FIG. 1, the quantity of the exhaust gas, which is fed back into the combustion chambers of the engine, is controlled to the desired value magrdes. The desired value magrdes is pregiven by the desired-value generator 2 and is thereafter compared to the actual value magract and is then correspondingly corrected. The adjustment of the exhaust-gas feedback takes place with the aid of the drive unit 4 and the adjustment of the exhaust-gas feedback valve 5 and/or the camshaft 6.

Figure 2:
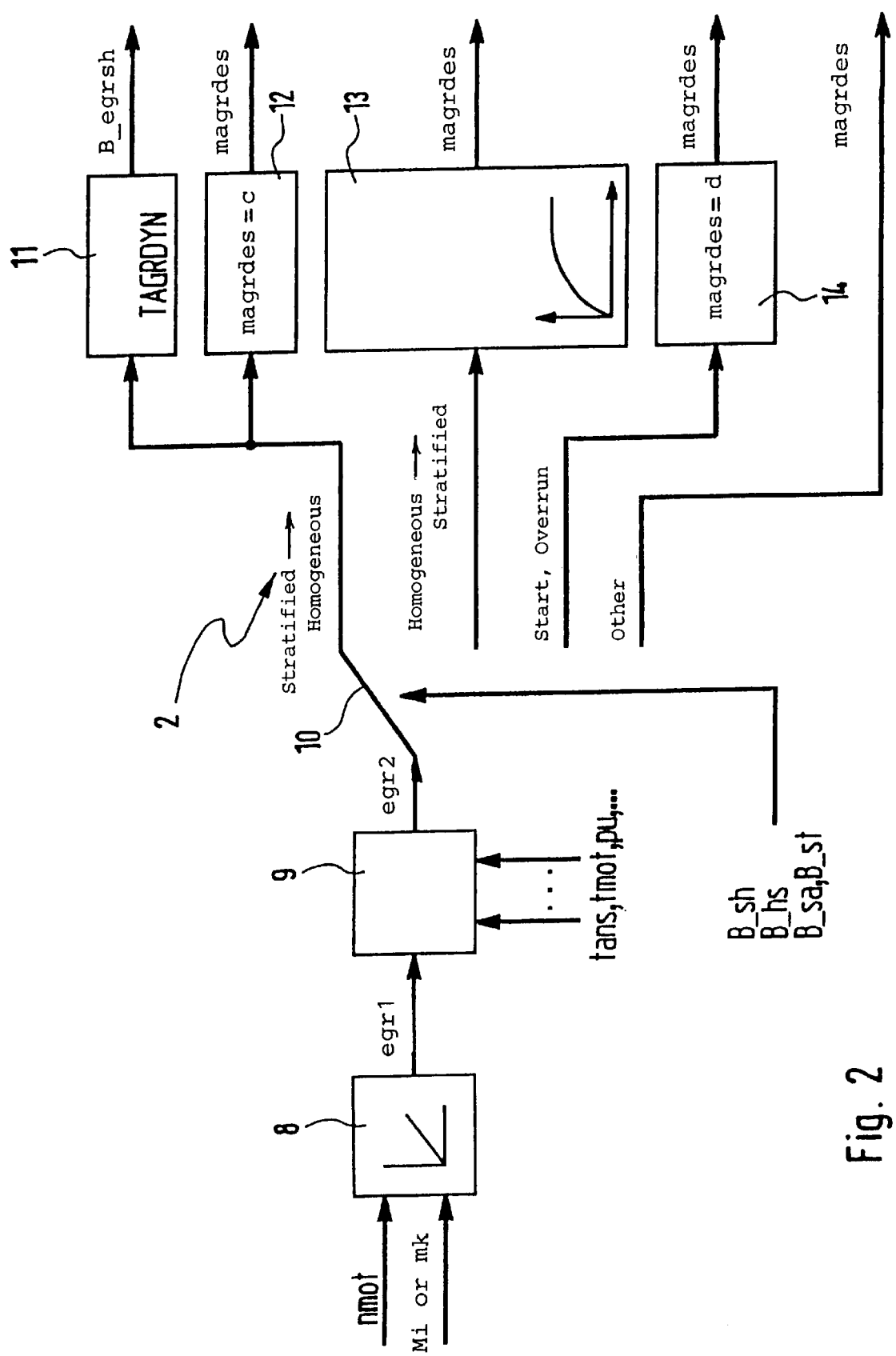
FIG. 2 shows a schematic block circuit diagram of a desired value generation for the control of FIG. 1; and, FIG. 3 shows a schematic block circuit diagram of a further consideration of the desired value generation of FIG. 2.

The desired-value generator 2 of FIG. 1 is shown in greater detail in FIG. 2. There, a first value egr1 for a desired exhaust-gas quantity to be fed back is determined from the rpm of the engine nmot and the indicated torque Mi or the fuel mass mk, which is to be injected, via a characteristic field 8. This value relates to a theoretical or standardized operating state of the engine, that is, to a specific temperature of the engine for example. From this first value egr1, a second value egr2 is determined for the desired exhaust-gas quantity to be fed back in a block 9 while considering the actual operating state of the engine. For example, in the block 9, the following are, for example, considered: the inducted air temperature tans and/or the engine temperature tmot and/or the ambient temperature pu and/or the degree of tank venting and/or other data as to the actual operating state of the engine.

The second value egr2 is thereafter distributed with the aid of switch 10. Switch 10 can assume four switching positions which can be selected with the aid of four binary signals.

If there is a signal B_sh=1, then this means that there should be a switchover from stratified charge operation into the homogeneous operation. In this case, the second value egr2 is connected to the terminal "stratified→homogeneous". If the signal is B_hs=1, then this means that there should be a switchover from homogeneous operation into the stratified charge operation. In this case, the second value egr2 is connected to a terminal "homogeneous→stratified". If the signal is B_sa=1 or the signal is a signal B_st=1, then this means that the engine is in a starting operation or is in overrun operation. In this case, the second value egr2 is connected to a terminal "start, overrun". In all other cases, the second value egr2 is connected to a terminal "other".

Should there be a switchover from the stratified operation into the homogeneous operation, that is B_sh=1, then the second value egr2 is applied to a time-delay element 11 and a block 12. The desired value magrdes is formed for the quantity of the exhaust gas to be fed back by the block 12 which is constant in homogeneous operation. This applies also to magrdes=c wherein c is a smaller value or can even be zero. The value c can but need not be dependent from the second value egr2. This constant value c for the desired value magrdes is made immediately available. The time duration TAGRDYN of the time-delay element 11 is dependent upon the dynamic of the exhaust-gas feedback and the dynamic of the intake manifold of the engine. Only after the time duration TAGRDYN has elapsed, is a binary signal B_egrsh generated by the time-delay element 11 after which there is an actual switchover into homogeneous operation.

Because of the time duration TAGRDYN, it is achieved that the exhaust gas, which is present in the exhaust-gas feedback and in the intake manifold, is still combusted during stratified charge operation and only then is there a switchover into the homogeneous operation with its lesser demand of exhaust gas to be fed back. Insofar, combustion misfires are therefore avoided which are caused by an excess of fed back exhaust gas.

If there is to be a switchover from homogeneous operation into the stratified charge operation (that is, B_sh=1), then the second value egr2 is applied to a block 13 with which the second value egr2 is adapted to the dynamic of the intake manifold of the engine. The desired value magrdes is therefore generated from the second value egr2 by a corresponding function. With this function, there can be, for example, a time-dependent adaptation so that the desired value magrdes corresponds essentially to the second value egr2 for the desired exhaust-gas quantity to be fed back at least in the steadystate condition. Accordingly, in stratified charge operation, the quantity of the exhaust gas, which is to be fed back is controlled to this desired value magrdes with the aid of the control 1 of FIG. 1. In this stratified operation, a quantity of exhaust gas, which is essentially different from zero, is fed back into the combustion chambers of the engine.

If the engine is in a starting operation or in overrun operation, then the desired value magrdes is adjusted with the aid of block 14 to a constant value d. Here, the concern can be a small quantity or even no fed back exhaust gas. In all other cases, the desired value magrdes corresponds directly to the second value egr2.

The combustion in these combustion chambers is influenced by the exhaust-gas quantity fed back into the combustion chambers of the engine. This is again compensated by corresponding corrections of the quantities which otherwise characterize the combustion. One such compensation is, for example, necessary in stratified charge operation because there, the most exhaust gas is fed back and this fed back exhaust gas therefore operates the most on the combustion.

Figure 3:
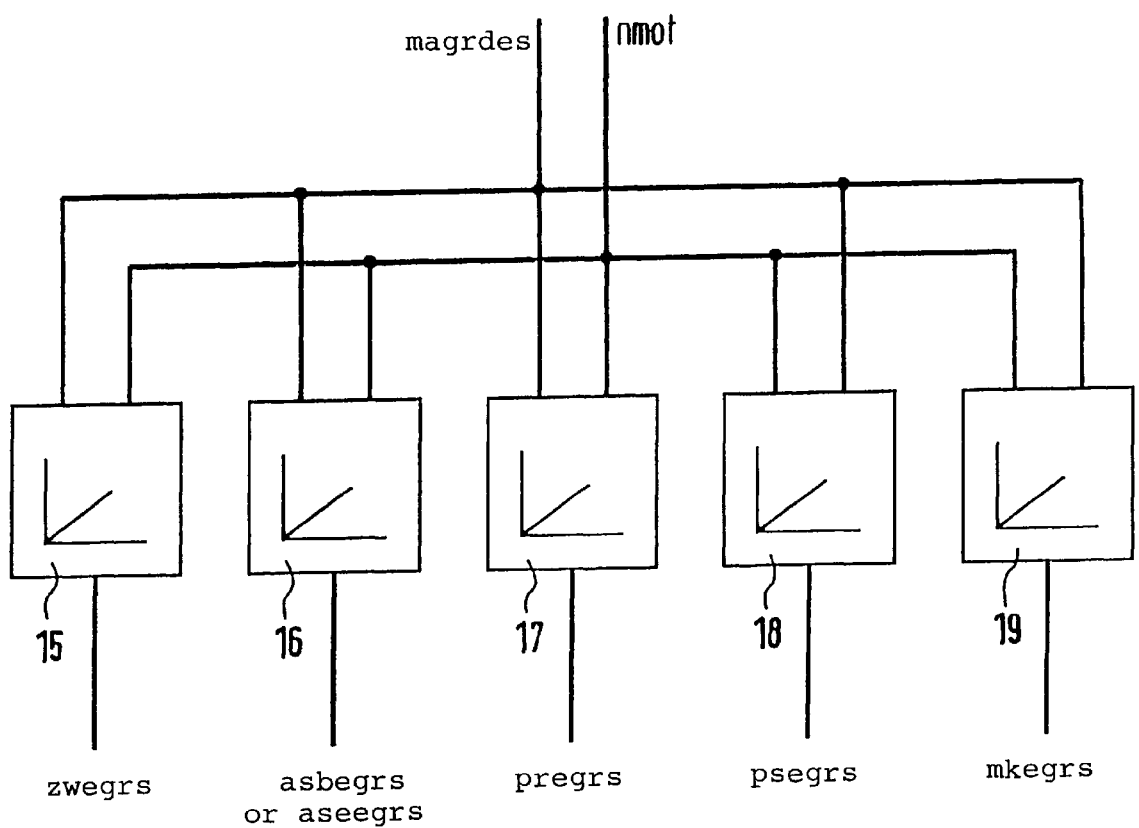

FIG. 3 shows how the desired value magrdes, which is generated by the desired-value generation 2, operates on other quantities which influence the combustion. Accordingly, the following are influenced in dependence upon the desired value magrdes especially via corresponding functions and/or characteristic fields 15, 16, 17, 18 and 19: the ignition angle zwegrs and/or the injection start asbegrs and/or the injection end aseegrs for the fuel to be injected and/or the fuel injection pressure pregrs and/or the intake manifold pressure psegrs and/or the injection quantity mkegrs. This influencing can furthermore be dependent also upon the rpm nmot of the engine.

The exhaust-gas quantity, which is fed back into the combustion chambers of the engine during stratified charge operation and during homogeneous operation, is controlled (open loop and/or closed loop) by a control apparatus especially with respect to a low fuel consumption and/or a reduced exhaust-gas development. Especially the exhaust-gas feedback is controlled (open loop and/or closed loop) with a view to the least possible nitrogen oxide emissions. For this purpose, the control apparatus is provided with a microprocessor which has a program stored in a storage medium and especially in a read-only-memory. This program is suitable to execute the above-mentioned control (open loop and/or closed loop). The control apparatus is especially suited to execute the block diagrams shown in FIGS. 1 to 3 in the form of a sequence. For this purpose, input signals such as nmot, tans and the like are applied to the control apparatus. These input signals indicate operating states of the engine measured via sensors and the control apparatus generates output signals such as the adjustment signals for the exhaust-gas feedback valve 5 and/or the camshaft 6 with which the performance of the engine can be influenced via actuators in correspondence to the desired control (open loop and/or closed loop).

What is claimed is:

1. A method of operating an internal combustion engine including an internal combustion engine of a motor vehicle wherein the fuel is injected directly into the combustion chamber of the engine either in a first operating mode during a compression phase or in a second operating mode during an induction phase, the method comprising the steps of:

feeding back at least a portion of the exhaust gas generated during combustion into the combustion chamber;

controlling the quantity of the exhaust gas fed back into the combustion chamber differently in the two modes of operation; and, utilizing the quantity of the exhaust gas, which is fed back into the combustion chamber of the engine, in the control of at least one of the fuel mass, which is infected into the combustion chamber, and the ignition spark, which ignites the fuel in the combustion chamber; and, the control of said exhaust gas being at least one of an open-loop control and a closed-loop control.

2. The method of claim 1, wherein: in the first mode of operation, the quantity of the exhaust gas, which is fed back into the combustion chamber, is controlled in dependence upon at least one of the following: the rpm (nmot) of the engine; the torque Mi, which is to be outputted by the engine; and, the fuel mass (mk) which is to be injected into the combustion chamber.

3. The method of claim 1, wherein: at least one of the following is considered: the inducted air temperature (tans); the engine temperature (tmot); the ambient pressure (pu); and, the degree of tank venting.

4. The method of claim 1, wherein: the quantity of the exhaust gas, which is fed back into the combustion chamber, is controlled in dependence upon the intake manifold pressure when there is a switchover into the first mode of operation.

5. The method of claim 1, wherein: a constant quantity (c), especially a small quantity or even no exhaust gas, is fed back in the second mode of operation.

6. The method of claim 1, wherein: for a switchover into the second mode of operation, an actual switchover is made only after a pregiven time duration (TAGRDYN).

7. The method of claim 1, wherein: for at least one of start and overrun operation of the engine, a constant quantity (d), especially a small quantity or even no exhaust gas, is fed back.

8. The method of claim 1, wherein: the exhaust gas is fed back into the combustion chamber of the engine via at least one of the following: an external exhaust-gas feedback and an internal exhaust-gas feedback.

9. The method of claim 1, wherein: the quantity of the actually fed back exhaust gas is determined in dependence upon at least one of the intake manifold pressure, the inducted air mass and the exhaust-gas temperature.

10. A method of operating an internal combustion engine including an internal combustion engine of a motor vehicle wherein the fuel is injected directly into the combustion chamber of the engine either in a first operating mode during a compression phase or in a second operating mode during an induction phase, the method comprising the steps of:

feeding back at least a portion of the exhaust gas generated during combustion into the combustion chamber;

controlling the quantity of the exhaust gas fed back into the combustion chamber differently in the two modes of operation;

utilizing the quantity of the exhaust gas, which is fed back into the combustion chamber of the engine, in the control of at least one of the fuel mass, which is injected into the combustion chamber, and the ignition spark, which ignites the fuel in the combustion chamber; and, the control of said exhaust gas being at least one of an open-loop control and a closed-loop control; and, determining the quantity of the actually fed back exhaust gas and comparing said quantity of the actually fed back exhaust gas to the desired quantity of the fed back exhaust gas and executing a correction in dependence thereon.

11. Electric storage medium for a control apparatus of an internal combustion engine including an internal combustion engine of a motor vehicle and wherein fuel is infected directly into the combustion chamber of the engine either in a first operating mode during a compression phase or in a second operating mode during an induction phase, the electric storage medium comprising:

a program stored thereon suitable to be run and to execute the following method steps on a computer apparatus:

feeding back at least a portion of the exhaust gas generated during combustion into the combustion chamber;

controlling the quantity of the exhaust gas fed back into the combustion chamber differently in the two modes of operation; and, utilizing the quantity of the exhaust gas, which is fed back into the combustion chamber of the engine, in the control of at least one of the fuel mass, which is injected into the combustion chamber, and the ignition spark, which ignites the fuel in the combustion chamber; and, the control of said exhaust gas being at least one of an open-loop control and a closed-loop control.

12. An internal combustion engine including an internal combustion engine for a motor vehicle, the engine comprising:

an injection valve with which fuel can be injected into a combustion chamber either in a first mode of operation during an induction phase or in a second mode of operation in an compression phase;

means for feeding back the exhaust gas into the combustion chamber;

a control apparatus for controlling the quantity of the exhaust gas, which is fed back into the combustion chamber, differently in the two modes of operation; and, wherein the control of said exhaust gas is at least one of an open-loop control and a closed-loop control; and, means for utilizing the quantity of the exhaust gas, which is fed back into the combustion chamber of the engine, in the control of at least one of the fuel mass, which is infected into the combustion chamber, and the ignition spark, which ignites the fuel in the combustion chamber; and, the control of said exhaust gas being at least one of an open-loop control and a closed-loop control.

13. The internal combustion engine of claim 12, wherein: an exhaust-gas feedback valve is provided which can be adjusted by the control apparatus to control the quantity of fedback exhaust gas.

14. The internal combustion engine of claim 12, wherein: a camshaft is provided which opens at least one of an inlet valve and an outlet valve and is adjustable by the control apparatus for controlling the quantity of fedback exhaust gas.

15. The internal combustion engine of claim 14, wherein: at least one of the position of the exhaust-gas feedback valve and the position of the camshaft can be detected by the control apparatus.

* * * * *

UNITED STATES PATENT AND TRADEMARK OFFICE
CERTIFICATE OF CORRECTION

PATENT NO. : 6,202,624 B1
DATED : March 20, 2001
INVENTOR(S) : Manfred Stuerz and Uwe Maienberg It is certified that error appears in the above-identified patent and that said Letters Patent is hereby corrected as shown below:

<u>Column 7,</u>
Line 22, delete "infected" and substitute -- injected -- therefor.

<u>Column 8,</u>
Line 17, delete "infected" and substitute -- injected -- therefor.
Line 55, delete "infected" and substitute -- injected -- therefor.

Signed and Sealed this

Eleventh Day of June, 2002

*Attest:*

JAMES E. ROGAN
*Attesting Officer*     *Director of the United States Patent and Trademark Office*